(12) United States Patent
Clayton et al.

(10) Patent No.: US 6,874,054 B2
(45) Date of Patent: Mar. 29, 2005

(54) DIRECT MEMORY ACCESS CONTROLLER SYSTEM WITH MESSAGE-BASED PROGRAMMING

(75) Inventors: Shawn Adam Clayton, Boylston, MA (US); Brian Mark Fortin, Hudson, MA (US); Daniel Brian Willie, Longmont, CO (US); John Leland Wood, Stratham, NH (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 33 days.

(21) Appl. No.: 10/324,310

(22) Filed: Dec. 19, 2002

(65) Prior Publication Data

US 2004/0123013 A1 Jun. 24, 2004

(51) Int. Cl.[7] .................. G06F 13/16; G06F 12/00; G06F 11/00
(52) U.S. Cl. .................. 710/310; 710/22; 710/52; 714/48
(58) Field of Search ............... 710/100, 22, 39, 710/40, 52, 305, 28, 313, 310, 240; 709/212, 236, 203; 712/36; 714/47, 799, 48; 711/151, 158; 345/535, 537; 370/463, 465, 412

(56) References Cited

U.S. PATENT DOCUMENTS

| | | | | |
|---|---|---|---|---|
| 4,783,734 A | | 11/1988 | May et al. | |
| 4,891,753 A | * | 1/1990 | Budde et al. | 712/217 |
| 5,325,510 A | * | 6/1994 | Frazier | 711/118 |
| 5,461,614 A | | 10/1995 | Lindholm | |
| 5,488,724 A | * | 1/1996 | Firoozmand | 709/212 |
| 5,621,662 A | | 4/1997 | Humpries et al. | |
| 5,724,613 A | * | 3/1998 | Wszolek | 710/33 |
| 5,964,831 A | | 10/1999 | Kearns et al. | |
| 6,128,509 A | | 10/2000 | Veijola et al. | |
| 6,370,598 B1 | | 4/2002 | Martwick | |

OTHER PUBLICATIONS

"Concurrency, latency, or system overhead:Which has the largest impact on uniprocessor DRAM–system performance?" by Cuppu, V.; Jacob, B. (abstract only) Publication Date: Jun. 30–Jul. 4, 2001.*

"Clockwise: a mixed–media file system" by Bosch, P.; Mullender, S.J.; Jensen, P.G. (abstract only) Publication Date: Jun. 7–11, 1999.*

* cited by examiner

Primary Examiner—Gopal C. Ray
(74) Attorney, Agent, or Firm—Morrison & Foerster LLP

(57) ABSTRACT

A data transfer system comprising a first bus interface, a second bus interface, a first-in-first-out memory, a controller and a message unit. The message unit is operable to queue a plurality of data transfer request messages from the first bus interface and the second bus interface. The controller is operable to process each data transfer request message and transfer data between the first bus interface, the first-in-first-out memory and the second bus interface. The controller is configured to calculate error detection codes (EDCs) and chain EDC values.

36 Claims, 6 Drawing Sheets

DMA Controller System

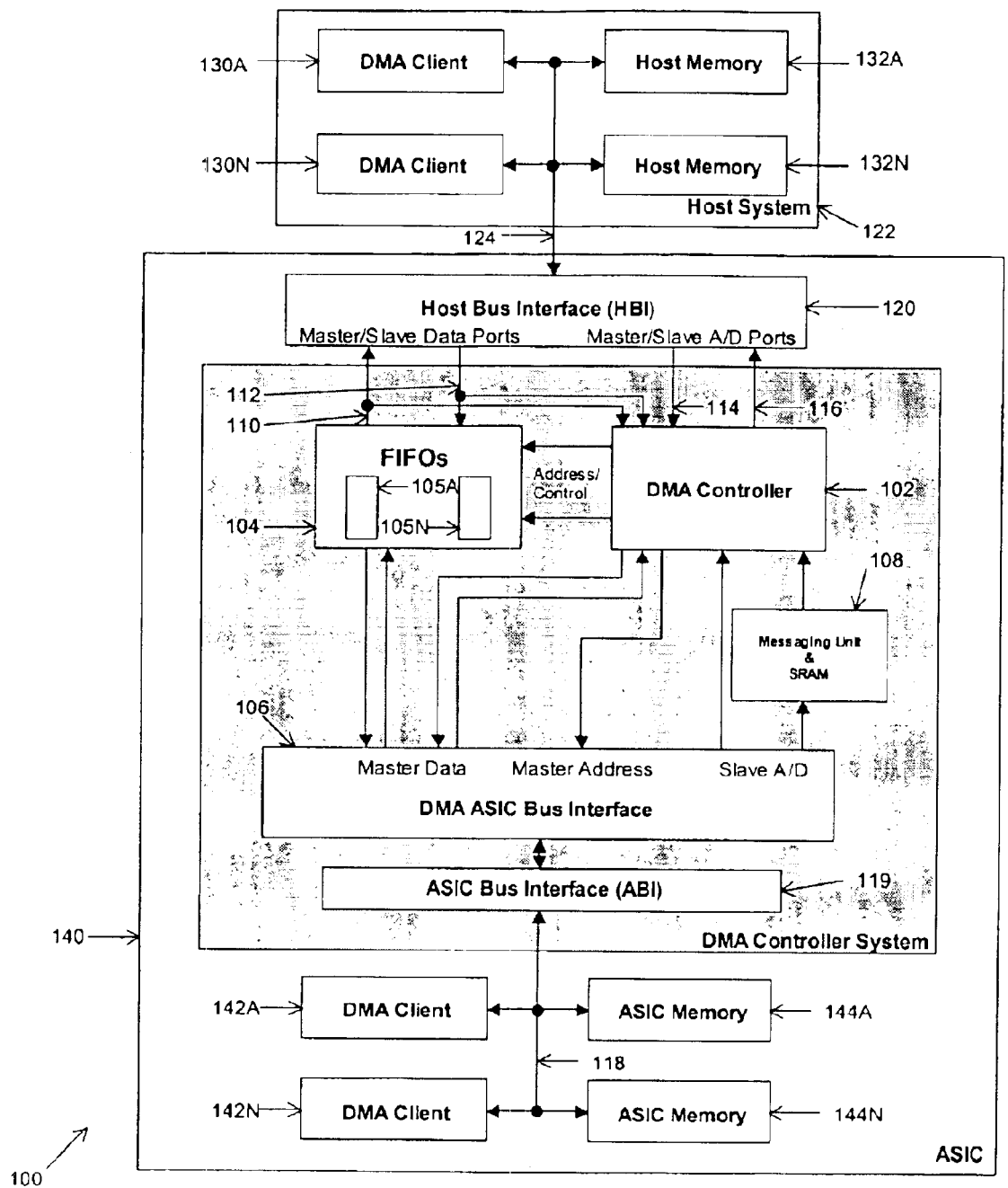
FIG. 1 DMA Controller System

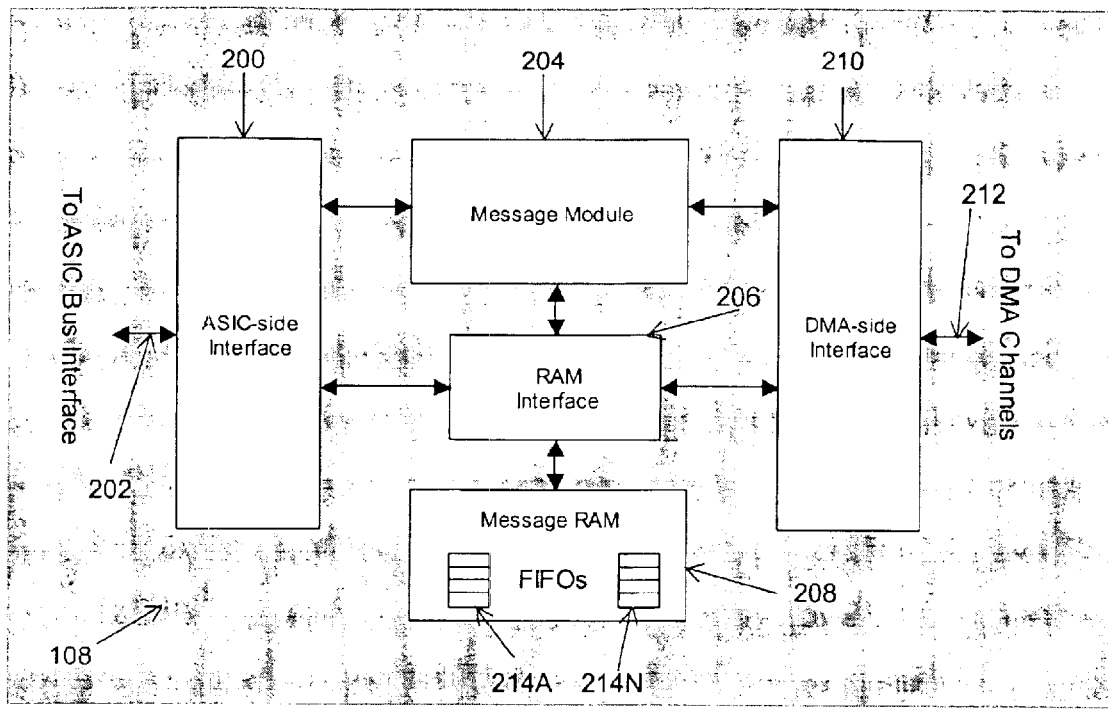
FIG. 2 Messaging Unit
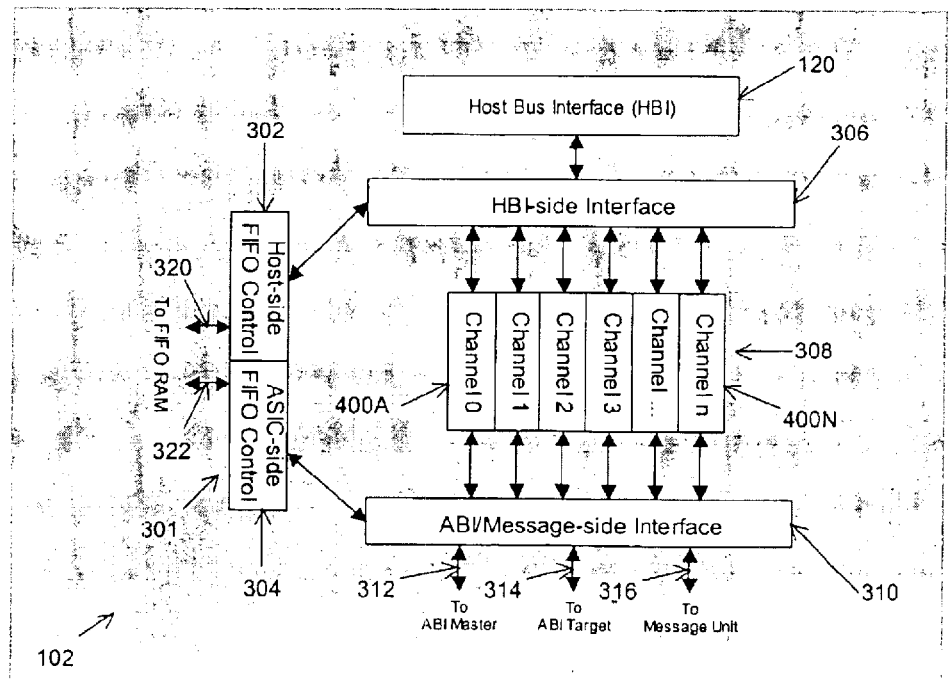
FIG. 3 DMA Controller

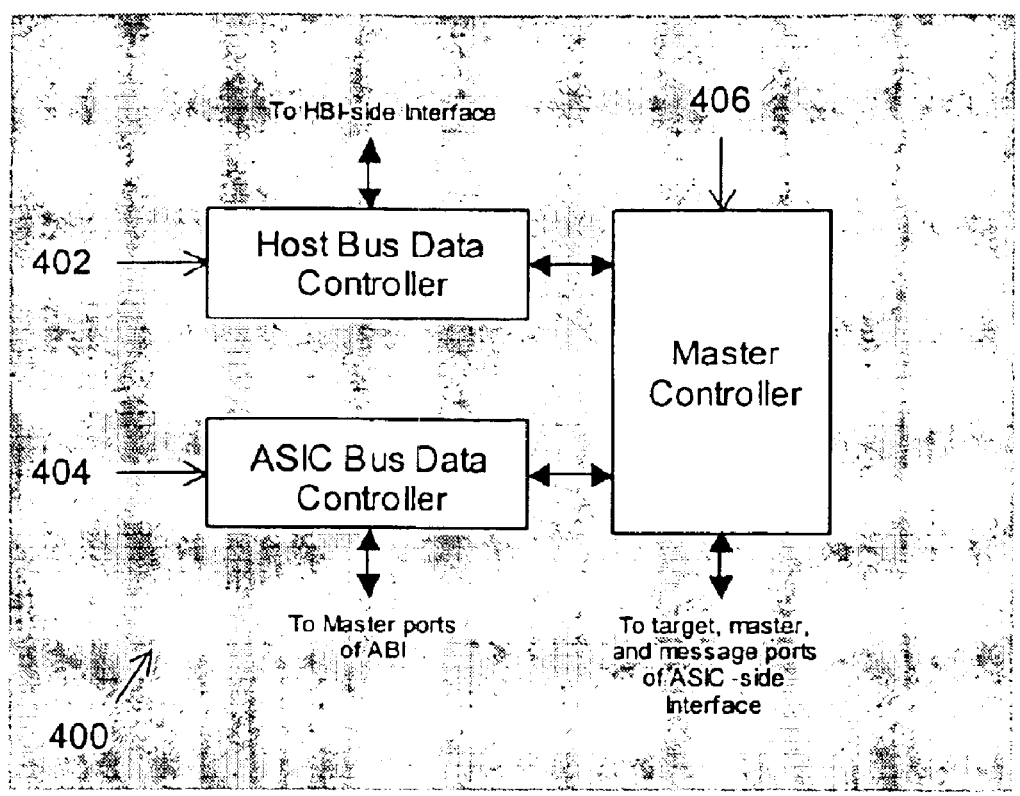
FIG. 4 DMA Channel

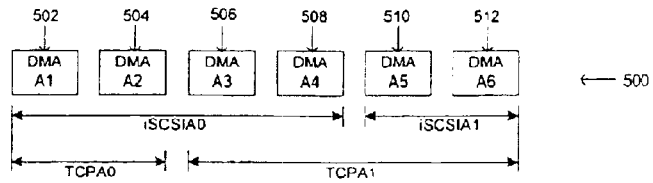

FIG. 5A

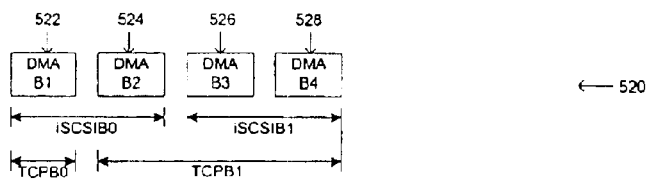

FIG. 5B

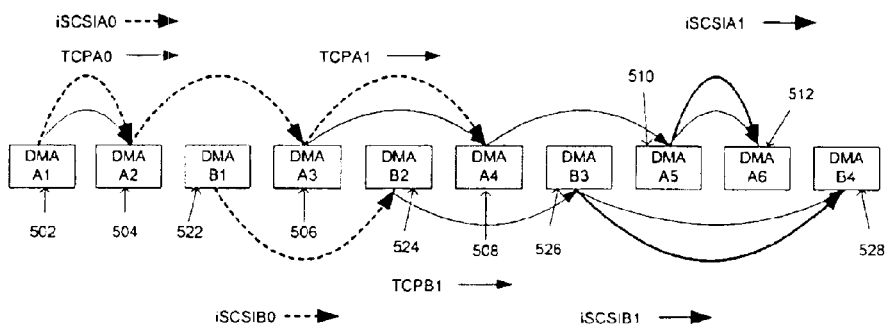

FIG. 5C

| DMA Descriptor | EDC 0 Context Read | EDC 1 Context Read | EDC 0 Context Written | EDC 1 Context Written |
|---|---|---|---|---|
| A1 | No seed | No seed | TCPA | iSCSIA |
| A2 | Previous | Previous | No partial | iSCSIA |
| B1 | No seed | No seed | No partial | iSCSIB |
| A3 | No seed | iSCSIA | TCPA | iSCSIA |
| B2 | No seed | iSCSIB | TCPB | No partial |
| A4 | TCPA | iSCSIA | TCPA | No partial |
| B3 | TCPB | No seed | TCPB | iSCSIB |
| A5 | TCPA | No seed | TCPA | iSCSIA |
| A6 | Previous | Previous | No partial | No partial |
| B4 | TCPB | iSCSIB | No partial | No partial |

FIG. 5D

No seed: Start of an EDC calcuation – no EDC seed required.
No partial: End of an EDC calculation – no EDC partial result (subsequent seed) required
Previous: EDC partial from the previous descriptor used directly as current EDC seed

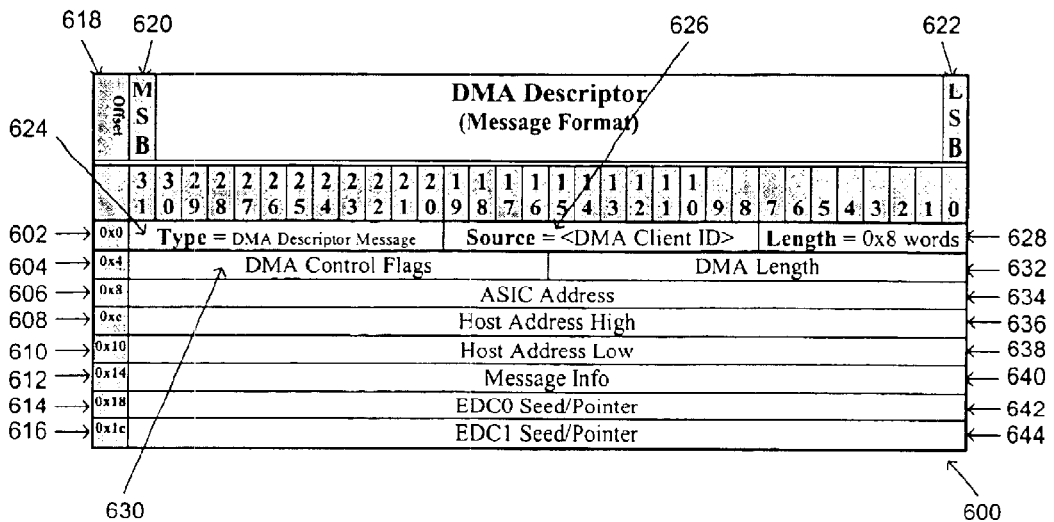
FIG. 6 DMA Descriptor Message
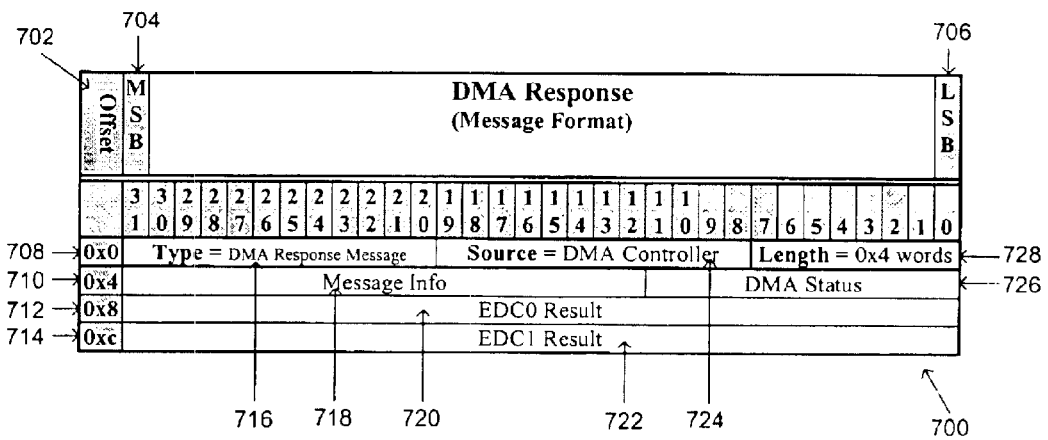
FIG. 7 DMA Response Message

DIRECT MEMORY ACCESS CONTROLLER SYSTEM WITH MESSAGE-BASED PROGRAMMING

BACKGROUND

A conventional direct memory access (DMA) controller receives commands from an entity and controls direct access of a memory coupled to the controller.

Cyclic redundancy codes (CRCs) and checksums may be used to detect errors in stored and retrieved data.

Processor overhead includes tasks the processor does other than the desired calculations. When processor overhead is reduced, the processor may use more of its resources for desired actions.

SUMMARY

A direct memory access (DMA) controller system and methods of using the controller are provided. In an embodiment, the DMA controller receives data transfer request messages, calculates cyclic redundancy codes (CRCs) and checksums and transfers data between two memories. One memory may be a host computer memory address space, such as a PCI-X address space. The other memory may be an application specific integrated circuit (ASIC) memory address space. The memory-to-memory transfer of data may be called a "DMA operation" or "DMA transfer."

Important factors in developing a DMA controller system may include (a) reducing the load on a shared memory, (b) reducing processor overhead of programming a DMA operation, (c) meeting CRC and checksum calculation requirements, and (d) providing high performance.

Shared memory may be a common resource that is shared between multiple ASIC units. As such, shared memory may easily become a bottleneck to performance. The messaging features of the DMA controller may help reduce the load on shared memory by not storing the DMA descriptor, or the response information, in shared memory. Both of these units of information may be handled as messages, which may use only local storage. Furthermore, reads generally cause more "load" on a resource (e.g., memory and busses) than writes do, because of the reads' request-response nature. By using messages, the DMA controller system eliminates at least one write and one read of shared memory for each DMA descriptor and each DMA response that is generated. Thus, the DMA controller may efficiently use busses and memory by using DMA descriptor messages.

Conventional shared memory may not scale (handle data transfers from more ASIC devices) very well. The DMA controller system reduces or eliminates the load on shared memory. The DMA controller system may be extendable or scalable. DMA performance may be scalable without a redesign of the firmware interface.

When processor overhead is reduced, the processor may use more of its resources for desired actions, e.g., for protocol processing instead of data movement. The DMA controller may accommodate a lower CPU cost by not consuming CPU cycles. Thus, a designer can use the DMA controller to satisfy better product performance requirements.

Calculating CRCs and checksums with the DMA controller system improves product performance and functionality. High performance may be a product goal.

The DMA controller may provide a number of other advantages. For example, the DMA controller may have multiple channels with programmable priorities.

The DMA controller may handle different CRC/checksum types, alignments, seeds, and context locations of data to be transferred. The DMA controller may simultaneously calculate an iSCSI (CRC32c) or a Fibre Channel (CRC32) cyclic redundancy code (CRC), and a Transmission Control Protocol (TCP) checksum on transferred data. Any CRCs and checksums to be calculated may be chosen on a per-DMA basis.

The DMA controller may efficiently use busses and memory or improve bus performance by "coalescing" multiple DMA transfers/operations into a smaller number of larger transfers via a host bus or an ASIC bus. The DMA controller may perform transfer "coalescing" by examining a number of descriptors in a message queue, and performing a single transfer on the bus which satisfies the data movement requirements of the descriptors.

The DMA controller may have a "message" interface (DMA controller descriptor messages and completion messages) for DMA clients. The message interface may be consistent for both firmware and hardware DMA clients. Thus, the message interface allows firmware and hardware entities to be DMA clients and control data transfers of the DMA controller.

The DMA controller may send a DMA completion notification message (with information about the DMA transaction) directly to a DMA client's selected response message queue. A DMA client may process the completion message locally without access to shared memory structures. The completion message may have enough information to allow firmware to schedule a firmware task with a given context.

The DMA controller may be flexible. An interface of the DMA controller may support the DMA needs of various protocols.

An interface of the DMA controller may be "multi-threaded," i.e., allow multiple clients/CPUs to concurrently queue DMA descriptors to the DMA controller. The DMA controller may enable multi-threaded access to the DMA controller without using semaphores by using serialization properties of message queues.

The DMA controller may provide DMA transfer control information, such as byte swapping, error handling and priority.

The DMA controller may allow host bus control information on a per-DMA basis, i.e., PCI-X: RO, NS.

The DMA controller may overcome a number of problems of a "typical" DMA controller. For example the DMA controller may reduce the bottleneck of using a shared memory. The DMA controller may process DMA "descriptors," which describe a DMA operation to be performed and are sent to the DMA controller in "messages." These messages may be stored and processed locally without access to shared memory structures. Both DMA descriptors and DMA completion information may be sent directly to local memories of clients using messages.

The DMA controller may eliminate performance problems associated with a "pull" model (bus reads) of handling DMA descriptors and DMA completion information. In an embodiment, the DMA controller may facilitate "pushing" messages, which eliminate the latencies associated with bus reads.

The DMA controller may allow the calculation of CRCs and checksums across logically contiguous, but spatially and temporally discontiguous, blocks of data.

The DMA controller may gain the performance advantages of having multiple outstanding transactions on the host bus, while preserving the operational simplicity of in-order, single-issue, DMA.

The DMA controller may allow a product to attain maximum performance, by offloading both hardware and firmware, while meeting functional requirements and time-to-market needs.

The DMA controller may employ a "sideband" error reporting mechanism by which the clients need not examine error status of DMA completions. This simplifies and optimizes the "fast path" performing DMA operations. A "sideband" error reporting mechanism moves error handling to dedicated firmware, which can be independent from the common-case code.

One aspect of the application relates to a data transfer system that comprises a first bus interface, a second bus interface, a first-in-first-out memory, a controller and a message unit. The first-in-first-out memory is coupled to the first bus interface and the second bus interface. The controller is coupled to the first-in-first-out memory. The message unit is coupled to the controller. The message unit is operable to queue a plurality of data transfer request messages from at least the first bus interface. The controller is operable to process each data transfer request message and transfer data between the first bus interface, the first-in-first-out memory and the second bus interface.

Another aspect relates to a memory access controller system that comprises a first bus interface, a second bus interface, a memory controller and a plurality of channels. The memory controller is operable to control reads and writes to a plurality of first-in-first-out memory queues. Each channel is operable to process a data transfer request message from the second bus interface, instruct the memory controller to write data from a second bus to a first-in-first-out memory queue associated with the channel, and instruct the memory controller to read data from the first-in-first-out memory queue to send to a first bus.

Another aspect relates to a message unit comprising a plurality of first-in-first-out memory queues. Each queue is operable to store a plurality of data transfer request messages from a first bus interface and a second bus interface. Each data transfer request message comprises a first address of a location in a source memory, a second address of a location in a destination memory, and a length of data to be transferred from the source memory to the destination memory.

Another aspect relates to a data transfer request message, which comprises a first address of a location in a source memory, a second address of a location in a destination memory, and a length of data to be transferred from a source memory to a destination memory.

Another aspect relates to a method of transferring data. The method comprises receiving a data transfer request message; queuing the data transfer request message; reading the data transfer request message; reading data specified by the data transfer request message from a source memory location and transferring the data to a first-in-first-out memory; and transferring the data stored in the first-in-first-out memory to a destination memory location specified by the data transfer request message.

The details of one or more embodiments are set forth in the accompanying drawings and the description below. Other features and advantages will be apparent from the description and drawings, and from the claims.

BRIEF DESCRIPTION OF THE DRAWINGS

FIG. 1 illustrates an embodiment of a system that includes a host bus interface, a DMA controller, a set of first-in-first-out (FIFO) memories, a DMA application specific integrated circuit (ASIC) bus interface (ABI) and a messaging unit.

FIG. 2 illustrates an embodiment of the messaging unit in FIG. 1.

FIG. 3 illustrates an embodiment of the DMA controller of FIG. 1.

FIG. 4 illustrates an embodiment of a DMA channel in FIG. 3.

FIG. 5A shows a logical set of transfers that includes six DMA operations.

FIG. 5B shows a second logical set of data transfers that includes four DMA operations.

FIG. 5C shows how the two logical sets of transfers in FIGS. 5A and 5B may be queued for the DMA controller in FIG. 1.

FIG. 5D illustrates which context locations are read and/or written in association with each DMA descriptor in FIG. 5C.

FIG. 6 illustrates one possible configuration or format of a DMA descriptor message used by the system of FIG. 1.

FIG. 7 illustrates one possible configuration of a DMA response message used by the system of FIG. 1.

DETAILED DESCRIPTION

Figure 8:
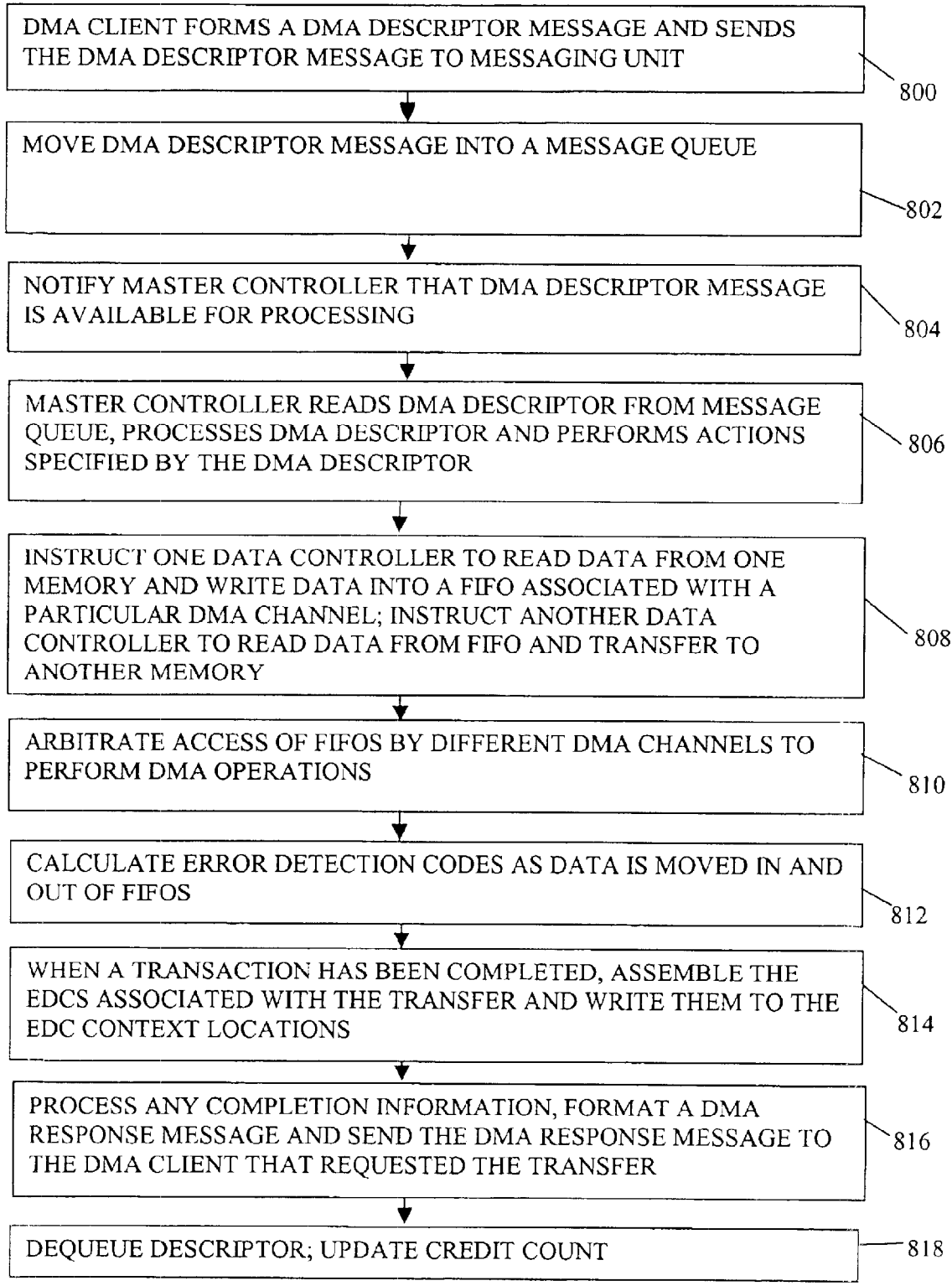
FIG. 8 illustrates an embodiment of a method of using the system in FIG. 1.

FIG. 1 illustrates an embodiment of a system 100 that includes a host system 122, a host bus 124 (e.g., PCI or PCI-X), and an application specific integrated circuit (ASIC) 140. The ASIC 140 may include a host bus master/target interface 120, master/slave data ports 110, 112, master/slave address/data (A/D) ports 114, 116, a RAM 104 with a plurality of first-in-first-out (FIFO) memories 105A–105N (also called "payload FIFOs"), a DMA controller 102, a messaging unit 108, a DMA ASIC bus interface 106, an ASIC bus 118, one or more DMA clients 142A–142B, an ASIC bus interface (ABI) 119 and an ASIC memory 144. The DMA clients 142A–142B can be either firmware or hardware entities.

The host bus master/target interface 120 may implement master or target functions with the host bus 124. The host system 122 may include one or more DMA clients 130A–130B and one or more host memories 132A–132N. The DMA clients 130A–130B can be either firmware or hardware entities.

In a configuration, the host system 122 does not have DMA "clients." this configuration, all DMA descriptors 600 (FIG. 6) and response messages 700 (FIG. 7) may stay within the ASIC 140.

Other embodiments of the system 100 may have other components in addition to or instead of the components shown in FIG. 1.

DMA ASIC Bus Interface

The DMA ASIC bus interface (ABI) 106 is coupled to the ASIC bus interface (ABI) 119, which is coupled to the ASIC bus 118 (one or more lines or buses, etc.). The DMA ASIC Bus Interface (ABI) 106 may handle the MUXing/de-MUXing of different master and slave interfaces of the DMA controller 102 down to a single master and single slave interface that communicates with the ASIC bus interface 119.

FIFOs

In an embodiment, the FIFO RAM 104 is a 12K FIFO SRAM, e.g., 128-bit×512-word RAM. The RAM 104 may comprise a number of programmable, logical FIFOs 105A–105N with programmable sizes of 4K, 4K, 1K, 1K, 1K and 1K. Other embodiments of the FIFO RAM 104 may have other sizes and configurations. In this embodiment, the sizes are not fixed, and can be changed as needed during performance tuning of the ASIC 140, or to adapt the ASIC 140 for different requirements over time. The sizes given are examples of a possible programmed configuration of the ASIC 140.

Each FIFO 105 may be associated with a single DMA channel 400 (FIGS. 3 and 4). Both read and write operations of a DMA channel 400 may access the same FIFO 105.

The allocation of the FIFO memory space to various channels 400–400N may be programmed at an initialization time and/or at other times. Each FIFO 105 may be allocated on a per-channel basis to optimize the use of the FIFOs 105A–105N for different types of operations. For example, the programming may allocate larger FIFOs 105 to channels 400 optimized for large bus transfers and allocate smaller FIFO buffers 105 to channels 400 for smaller bus transfers.

Data transfers between the host 122 and the FIFOS 105A–105N (via the host bus interface 120) may be independent of data transfers between the ASIC 140 and the FIFOs 105A–105N (via the DMA ASIC bus interface 106). For example, a host-side data transfer may have a different clock frequency than an ASIC-side data transfer. Data transfers may be initiated based on programmable FIFO watermark values, as described below.

Messaging Unit

FIG. 2 illustrates an embodiment of the messaging unit 108 in FIG. 1. The messaging unit 108 includes "ASIC-side" interface logic 200, a common message module 204, a random access memory (RAM) interface 206, a message RAM 208 for storing messages, and "DMA-side" interface logic 210.

The message module 204 of the messaging unit 108 provides control logic for message queues 214A–214N in the message RAM 208. The message queues 214A–214N hold DMA descriptor messages, such as the DMA descriptor message 600 shown in FIG. 6.

The "ASIC-side" interface logic 200 has a path 202 to the DMA ASIC bus interface 106 (FIG. 1). The ASIC-side interface logic 200 communicates with an ABI target module (DMA client 142 coupled to the ABI 119) for the DMA controller 102. The ASIC-side interface logic 200 provides address space decode for direct RAM access and message queues 214A–214N in the message RAM 208.

The "DMA-side" interface logic 210 has a path 212 to DMA channels 400A–400N (see FIG. 3) of the DMA controller 102. The DMA-side interface logic 210 interfaces with DMA channels 400A–400N, notifies the DMA channels 400A–400N of available DMA descriptors 600 (FIG. 6) in the message queues 214A–214N in the message RAM 208, and provides access to the descriptors 600.

The RAM interface 206 handles arbitration into the RAM 208 from (a) the ASIC-side interface 200, which may write incoming ASIC bus descriptors 600 via the message module 204, (b) the ASIC-side interface 200 doing debug access (diagnostic reads and writes), and (c) the DMA-side interface 210 reading/loading DMA descriptors 600. Diagnostic reads and writes are used to self-test the ASIC 140, for isolating hardware faults, and to examine the descriptor queues 214A–214N when firmware is performing error handling.

The message module 204 may provide address and control information (e.g., head and tail pointers into the SRAM 208 for the location of each of the message queues 214A–214N) for requests that come from the ASIC-side interface 200 and the DMA-side interface 210.

In an embodiment, the RAM 208 is a 4K static RAM (SRAM). The RAM 208 provides memory space for a plurality of message queues 214A–214N, one message queue per DMA channel 400 (FIG. 4). The sizes of the message queues 214A–214N may be programmable in the same fashion, and for the same reasons, as the sizes of the FIFOs 105A–105N.

DMA Controller

The DMA controller 102 in FIG. 1 is coupled between the host bus interface (HBI) 120 and the DMA ASIC bus interface (ABI) 106. In an embodiment, the DMA controller 102 is a non-CPU device that operates to copy data from one memory (e.g., ASIC memory 144) to a buffer (a FIFO 105) and then to another memory (e.g., host memory 132).

FIG. 3 illustrates an embodiment of the DMA controller 102 of FIG. 1. The DMA controller 102 includes a FIFO interface module 301 (including a host-side FIFO control unit/controller 302 and an ASIC-side FIFO control unit/controller 304), an HBI-side interface module 306, a plurality of individual DMA channels 400A–400N, and an ABI/message-side interface module 310.

The host-side interface 306 may control the host bus interface (HBI) 120 and host bus protocol specific functions (e.g., handle PCI-X split transactions, errors, PCI-X transfer sizes, attributes and choosing a PCI-X "tag" on PCI-X transactions). The host-side interface 306 may also arbitrate between requests from the DMA channels 400A–400N. The arbitration of requests may be done according to the assigned priority levels of the channels 400A–400N, and round-robin among channels 400A–400N with the same priority level. Low priority requests may be starved by a number of high priority requests.

A PCI-X "tag" may have two variables: {Desc_Seq, Channel_Num}. "Channel_Num" is the channel number (e.g., 0–5) that requested the transaction. "Desc_Seq" may include two bits that increment with each new DMA descriptor 600 that is processed. A channel 400 may issue all transactions associated with a given descriptor, and Desc_Seq will stay the same value. When Desc_Seq changes, it indicates that a requested transaction is for the next descriptor 600.

Desc_Seq may be used to help analyze and debug PCI-X bus analyzer traces. A logical DMA operation may take a number of DMA descriptors 600 to describe. Each DMA descriptor 600 may then take a number of PCI-X bus transactions to realize. The Desc_Seq is useful to help associate the PCI-X bus transactions with the DMA descriptors 600 that caused the PCI-X bus transactions.

The ABI/message-side interface module 310 may handle ABI master, ABI target, and messaging unit interface tasks. An ABI master port 312 is used to send completion messages and message credit updates to a DMA client 142 in the ASIC 140.

A DMA client 142 may have a message credit count register that tracks "message credits." Message credits may be used by DMA clients 142 to track available message queue space in a queue 214 of the message RAM 208, as described further below.

The ABI master port 312 may provide address information of payload data stored in the ASIC memory 144 to be transferred from the ASIC 140 to FIFOs 105A–105N.

The ABI/message-side interface 310 may provide arbitration for the different channels' master ABI requests.

An ABI target port 314 provides access to DMA channel register space in the DMA controller 102.

The ABI/message-side interface 310 may receive DMA descriptors 600 from the messaging unit 108 via a message port 316.

In an embodiment, the DMA controller 102 has six DMA channels 400A–400N, and the messaging unit 108 manages six corresponding message queues 214A–214N. In a configuration, one or more DMA channels 400 may be dedicated to data transmit (read) operations.

The host-side FIFO control 302 handles the host side data transfers of the FIFOs 105A–105N and may operate in a host (e.g., PCI) clock domain. The ASIC-side FIFO control 304 handles the ASIC side data transfers of the FIFOs 104A–105N and may operate in an ASIC clock domain. The two clock domains may be asynchronous and may vary from 0 MHZ to 133 MHZ in an embodiment.

In a configuration, the FIFO control blocks 302, 304 do not handle arbitration. Arbitration may be handled by the host-side and ASIC-side interface blocks 306, 310.

The FIFO control blocks 302, 304 may control two RAM ports 320, 322 and handle alignment differences between the host and ASIC busses 124, 118. Alignment differences may relate to a property that the data to be transferred between the two busses 124, 118 may be aligned to different bytes on each bus. Also, there may be some logic that handles (a) different clock frequencies between the two busses 124, 118, and (b) different data transfer sizes on the two different busses 124, 118.

The FIFO control blocks 302, 304 may also calculate EDCs (CRCs, checksums, parity generation) on the data. Each DMA channel 400 may be responsible for all other aspects of handling EDCs.

Multiple Channels

An important aspect of scaling performance may be to scale (increase) the number of DMA channels 400A–400N in FIG. 3. These DMA channels 400A–400N may operate independently and with different priorities. Each channel 400 may have its own message queue 214 in the message RAM 208 (FIG. 2) and its own data path, depending on data transfer requirements. A low priority channel 400 may be used for low priority bulk data transfers. A high priority channel 400 may be used for short, high priority data transfers.

The use of multiple DMA channels 400A–400N may be important for a host bus 124 such as PCI-X, and when dealing with high-latency host interfaces, such as PCI Express and Infiniband. To mitigate a large host memory read latency, a number of channels 400A–400N may all process outstanding (pending) read transactions.

The order of executing DMA operations may advantageously be preserved by a message queue 214 and a DMA channel 400. Subsequent transactions may not start until the previous DMA operation has been completed. Thus, multiple channels may satisfy many data transfer needs where (a) data needs to be delivered "in order" with respect to control operations, and (b) control operations are required to be delivered "in order" with respect to other control operations.

Transactions that do not require "in order" delivery may be split across multiple channels 400A–400N to increase the number of parallel operations. This improves data transfer performance.

DMA Channel

FIG. 4 illustrates an embodiment of a DMA channel 400 in FIG. 3. The DMA channel 400 includes a host bus data controller 402, an ASIC bus data controller 404 and a master controller 406.

The host bus data controller 402 interfaces with the host-side interface 306 (FIG. 3), the host-side FIFO controller 302, and the master controller 406. The host bus data controller 402 makes data transfer requests on the host bus 124 (FIG. 1) on behalf of the master controller 406. The host bus data controller 402 manages the host side of a payload FIFO 105 and decides when to request data transfers and how large of a transfer to request.

The host bus data controller 402 may hold any "state" that should be held during a host bus transfer. This "state" (e.g., digital state) may comprise information such as the total number of bytes to transfer, the total number of bytes transferred so far, the total number of bytes in the current bus request, the total number of byte transferred for the current bus request, if the channel 400 is waiting for a PCI-X "split completion," and other information the controller 402 may need to hold for the duration of the transfer.

The ABI data controller 404 interfaces with the ASIC-side interface 310 (FIG. 3), the ASIC-side FIFO controller 304, and the master controller 406. The ABI data controller 404 makes data transfer requests on the ABI 118 on behalf of the master controller 406. The ABI data controller 404 manages the ASIC side of a payload FIFO 105, and decides when to request data transfers and how large of a transfer to request. The ABI data controller 404 may hold any state that is required to be held during the data transfer on the ABI. This "state" (e.g., digital state) may comprise information such as the total number of bytes to transfer, the total number of bytes transferred so far, the total number of bytes in the current bus request, the total number of byte transferred for the current bus request, and other information the controller 404 may need to hold for the duration of the transfer.

The master controller 406 receives message notifications from the ABI/message-side interface 310 (FIG. 3), fetches a DMA descriptor 600 (FIG. 6) from the messaging unit 108 (FIG. 1), and decodes the DMA descriptor 600. Based on information in the decoded DMA descriptor 600, the master controller 406 may pass appropriate information to the host bus interface controller 402 and the ASIC bus data controller 404. The master controller 406 may provide any coordination between the controllers 402, 404.

The master controller 406 may also perform "coalescing" detection and EDC control (described below). The master controller 406 may include a state machine. The master controller 406 may also generate completion messages and credit updates to send to DMA clients 130, 142 (described below).

DMA Descriptor

FIG. 6 illustrates one possible configuration or format of a DMA descriptor message 600. The DMA descriptor 600 includes a local (ASIC) address field 634, host bus (i.e., PCI-X) address fields 636, 638, a length of the DMA transfer field 632, DMA control flag fields 630, EDC fields 642, 644, such as seed context pointers, and message information 640 to be copied into the response message 700 (FIG. 7) for response identification purposes. Other embodiments of the DMA descriptor may have other fields in addition to or instead of the fields shown in FIG. 6.

The "DMA control flags" field 630 may indicate a direction of the data transfer. The "flags" field 630 may also comprise the EDC types and "start" and "end" flags.

The "source" field 626 is used to encode the client ID for error recovery or diagnostic purposes (e.g., to determine which client 142 sent a descriptor 600). The "source" field 626 may be ignored by the hardware.

Operation of DMA Controller System

Data may be transferred from the ASIC memory 144 to the host memory 132 or vice versa. As an example, a data transfer from the ASIC memory 144 to the host memory 132 is described.

FIG. 8 illustrates an embodiment of a method of using the system 100 in FIG. 1. In a block 800, an ASIC DMA client 142 (FIG. 1) (hardware or firmware) wishes to transfer data from the ASIC memory 144 to the host memory 132. The ASIC DMA client 142 forms a DMA descriptor message 600 (FIG. 6). An ASIC processor's local memory or associated hardware and firmware may format the descriptor 600.

According to one method, the DMA client 142 sends the DMA descriptor 600 to the DMA controller 102 using a CPU block transfer.

According to another method, the DMA descriptor message 600 may be directly written into a DMA message queue 214 (in the message RAM 208 of the messaging unit 108) using processor stores, via the ABI 119, the ASIC bus 118 and the DMA ASIC bus interface 106. If writing directly into the DMA message queue 214, the queue 214 is not shared with any other processors in a configuration, since the queue 214 will be written one word at a time (e.g., 8 transactions) and could otherwise be interleaved with other writes by one processor to the queue 214.

In an embodiment, when using the DMA controller 102, it is guaranteed that 32-byte descriptors (sent as a CPU block data transfer) will be contiguous operations in the message queue 214.

The DMA client 142 may select a DMA channel 400 to use according to one or more methods. In one method, the ASIC 140 distributes the clients 142A–142N evenly across the channels 400A–400N. In another method, the ASIC 140 partitions the channels 400A–400N by function (i.e., DMA reads/writes, small/large transfers), and then distributes the clients 142A–142B evenly across the channels 400A–400N based on the functions each client 142 requires.

Each DMA channel 400 is associated with a dedicated message queue 214. Each message queue 214 has an ASIC bus address by which the message queue 214 can be addressed. The DMA client 142 queues a DMA descriptor 600 to a given channel 400 by performing the CPU block write of the descriptor 600 to the address of that channel's message queue 214.

In a block 802, the message module 204 (FIG. 2) in the messaging unit 108 the DMA descriptor message 600 into a selected message queue 214 in the RAM 208 through the RAM interface module 206. The DMA descriptor message 600 is stored in the message queue 214. The message queue 214 may also be called a "message FIFO." When the entire message 600 has been queued, the messaging module 204 may notify the DMA-side interface 210 of the message availability.

In a block 804, the DMA-side interface 210 of the messaging unit 204 communicates with the ABI/Message-side interface 310 (FIG. 3) of the DMA controller 102. The ABI/Message-side interface 310 communicates with the master controller 406 (FIG. 4) of an appropriate DMA channel 400 that is associated with the particular message queue 214. The ABI/Message-side interface 310 informs the master controller 406 that a DMA descriptor message 600 is available for processing.

In a block 806, when the master controller 406 is ready, it reads the DMA descriptor 600 (FIG. 6) from the message queue 214 in the message RAM 208. The master controller 406 processes the DMA descriptor 600 and performs actions specified by the DMA descriptor 600.

EDC Seed

"Seed values" EDC calculation are generally values that were produced from a previous "partial" EDC calculation (see FIGS. 5A–5D described below). For example, if a single EDC needs to be generated across data that is moved as two separate DMA operations (see FIG. 5C), the EDC result that is returned for the first DMA operation is used to "seed" the EDC calculation for the second DMA operation. After the second (or final) DMA operation is complete, the resulting EDC will be the correct EDC for the entire block of data that was moved by the two or more DMA operations.

When performing EDC chaining through "pointers" (bits in the DMA control flags field 630 may indicate when to do so), the value in a EDC seed/pointer field 642, 644 is treated as a pointer to an EDC "context location" somewhere in the ASIC memory 144, in which the seed value is to be stored. The actual location may not be important. It may be sufficient for the pointer to point to a memory "context location" that stores a "partial" EDC result. The partial EDC result may be used later to seed a subsequent EDC calculation.

Alternatively, the seed/pointer field 642, 644 may directly hold a seed value for the EDC calculation. That is an option left for ASIC firmware to use if the ASIC firmware desires to control the "chaining" directly, and not have the DMA controller 102 use EDC context locations to "automatically" chain EDC results.

If the DMA transfer needs seed values from EDC context locations, the master controller 406 may initiate the reads of the seed values. When the master controller 406 completes reading of the seed values, the master controller 406 will activate the HBI and ABI data controllers 402, 404.

In a block 808, depending on the direction of transfer, the master controller 406 instructs one of the data controllers 402 or 404 to start reading data from the ASIC memory 144 or the host memory 132 and write data into the FIFO 105 associated with the particular DMA channel 400. The other data controller 402 or 404 will read data out of the FIFO 105 as the FIFO 105 fills. The host bus data controller 402 will use the HBI-side interface 306 and the host-side FIFO controller 302. The ASIC bus data controller 404 will use the ABI/message-side interface 310 and the ASIC-side FIFO controller 304.

The data controller 402 or 404 that will read data from the bus may compare the available space in the FIFO 105 with a programmable watermark value in a field of a DMA configuration register in the controller 102. If the amount of space is greater than the programmed watermark value, a bus read will be requested, and data will be written to the FIFO 105.

The data controller 402 or 404 that will write data to the bus may use a similar method, except the data-writing controller waits for used FIFO space instead of free FIFO space and uses a programmable watermark value (a field of a DMA configuration register in the DMA controller 102) appropriate for that purpose.

In a block 810, on the host side, the host-side interface 306 of the DMA controller 102 arbitrates between the different channels 400A–400N for access to the host-side FIFO controller 302 and the FIFOs 105A–105N. The arbitration may be according to priority of the channels 400A–400N and round-robin among channels 400A–400N with the same priority. Low priority starvation is possible.

The host-side interface 306 may handle termination conditions. Depending on a configuration specified in a DMA configuration register, a PCI-X core may terminate the current transaction on different conditions. Changing the conditions on which transactions are re-arbitrated allows performance tuning based on the behavior of real systems.

On the ABI side, the ASIC-side interface 310 of the DMA controller 102 arbitrates between the various channels 400A–400N and provides access to the ABI master interface 312 and the ASIC FIFO controller 304. The arbitration may be based on priorities assigned to the DMA channels 400A–400N and round-robin among channels 400A–400N with the same priority. Low priority starvation is possible.

In a block 812, the FIFO control blocks 301, 302 may calculate EDCs as data is written in or read out of the FIFO RAM 104. Byte-wide parity may be calculated and written into the FIFO 105 along with the data. Parity is checked as data is read out of the FIFO 105. CRCs and checksums may be calculated as data is being written or read, for example, on the ASIC side of the FIFO 105.

In a block 814, when a transaction has been completed (i.e., data has been transferred from the ASIC memory 144 via the ABI 119 to one of the FIFOs 105A–105N to the host memory 132 or vice versa), the master data controller 406 will assemble the EDCs associated with the transfer and write them to EDC context locations, if so specified by the flags field 630 in the DMA descriptor 600 (FIG. 6).

The "ASIC address" the DMA descriptor 600 is the address of the data to be moved by the DMA operation. The ASIC address 634 may point to a "buffer" location in the ASIC memory 144. The DMA controller 102 may do a write with the value of the local buffer address to a de-allocate register of a buffer manager in the ASIC 140 to de-allocate the buffer (if so directed by DMA control flag bits 630). The "buffer manager" another function in ASIC 140.

DMA Response Message

In a block 816, the master controller 406 may process any completion information, format a DMA response message 700 and send the DMA response message 700 to the DMA client 142 that requested the transfer, if so specified by the Message Info field 640 in the DMA descriptor 600. The master controller 406 may send the DMA response message 700 to a message queue of the DMA client 142 as indicated in the DMA descriptor 600.

FIG. 7 illustrates one possible configuration of a DMA response message 700. The response message 700 includes a "message info" field 718 partially copied from the message info field 640 of the originating DMA descriptor 600. The message information field 718 identifies the completed DMA operation and may be used by the DMA client 142 to identify a context associated with the originating DMA descriptor 600. For example, the message information field 718 may be used as an index into an "outstanding operation table," which tracks pending DMA operations by the DMA client 142.

The DMA response message 700 includes an information field 718 that identifies which DMA completed (copied from the DMA descriptor 600), a completion status information field 726, and the results of any EDC calculations 720, 722 that were performed.

When a response message 700 is received by a DMA client 142, the DMA_STATUS field 726 should be checked for success (e.g., zero).

After the DMA response message 700 is formatted and sent, the DMA channel 400 is ready to start processing another descriptor 600.

In a block 818, the master controller 406 will de-queue the descriptor 600 from the messaging unit 108. The message unit 108 may update a head pointer.

Credit Count Register

Before processing the next descriptor 600, the master controller 406 may do a credit-update write to an appropriate credit count register (associated with the DMA client 142). A credit count register may be used by a DMA client 142 to keep track of available message queue space in a queue 214 of the message RAM 208.

The DMA controller 102 may send response messages 700 without respect to credits. When a DMA client 142 inserts instructions in a DMA descriptor 600 that request a response message 700, the DMA client 142 is responsible for ensuring that there is room for the response message 700 in a response message queue at the DMA client 142. This can be done by making the response queue as deep as the DMA queue 214, or by limiting the number of outstanding DMA requests to the size of the response queue. The DMA client 142 can also make use of a credit count register to manage response message queue credits.

Suppressing the EDC Context Read

When data is being written to or read from a FIFO 105, the master controller 406 may look ahead at the next descriptor 600 in the queue 214 and suppress the EDC context read if one or both of the EDC fields 642, 644 of the next descriptor 600 reference the same context as the current descriptor 600.

In an example, two consecutive descriptors 600 both have pointer values (e.g., in field 642 and/or 644) for EDC0 and/or EDC1 that are the same, and are chaining EDC seed values through the context locations pointed to by EDC0 and/or EDC1 fields 642, 644. The second descriptor 600 would cause the master controller 406 to read the seed value from the context location (pointed to by EDC0 or EDC1). In this case, the bus read can be skipped because the master controller 406 has internally saved the result from the previous write to the EDC context location pointed to by EDC0 or EDC1. This internal value can be used instead of reading the value from the EDC context location. This is a further performance optimization to reduce the number of reads performed on the bus 118.

This may be used for chaining/interleaving EDC calculations, as described below.

Failed DMA Operation

If a DMA operation fails for some reason, the DMA descriptor 600 will be left at the head of the message queue 214 in the message RAM 208 and signal an interrupt to invoke a firmware error handler. A firmware routine on a CPU (external to the DMA controller 102, but internal to the ASIC 140) may execute the firmware error handler.

If the error condition is cleared by the firmware error handler, and the DMA controller 102 is re-started, the DMA controller 102 will re-try the failed DMA operation.

Skipping the failed DMA operation may require firmware executed by the CPU to "fix" the message queue head pointer stored in the message module 204 to skip the descriptor 600 of the failed operation, deal with any credit updates that may be required, and then re-start the DMA controller 102. These error recovery operations may occur even as new descriptors 600 are being added to the message queues 214A–214N in the message RAM 208 by DMA clients 142.

An exception may be errors that occur after the descriptor 600 has been consumed. Such errors may relate to response messages, credit updates or CRC context writes. Such errors cannot be retried because the state present before the DMA operation started (such as EDC context location) may have been modified. Restarting such a failed operation may result in incorrect results, even if the error did not repeat.

Message Passing

In a "typical" DMA controller, in order to add a DMA descriptor to a "ring" or "list," a DMA client must update pointers. If there are multiple clients, the updating of the pointers, and hence the queuing of DMA descriptors to the DMA controller, must be serialized so that the pointers have consistent values. The typical problem is that two clients could read the existing value of a pointer, increment it, and write it back. Instead of the pointer being incremented by two, each client incremented it by one from the original value. The normal serialization method used to prevent such problems is to use a semaphore to only allow one client into the code segment that manipulates the pointer values.

However, the use of semaphores and requiring the client to perform pointer manipulations reduce performance and complicate the design of the client, especially if the client is another hardware unit. The use of semaphores reduces performance because some clients must wait while another client has "locked" the semaphore. Semaphore "lock" contention is a common problem in multi-processor systems, and should be avoided for high performance. Also, the bus accesses required to lock the semaphore, read the pointer value, write the pointer value, and release the semaphore are operations that cause extra load on busses and memory.

The system 100 (FIG. 1) described herein uses a message-based programming model. In the message-based programming model, a DMA descriptor is formatted and sent as a DMA descriptor message 600 (FIG. 6) from a DMA client 130, 142 to the messaging unit 108 and the DMA controller 102. The DMA controller 102 may send back any completion information as a DMA response message 700 (FIG. 7) to the DMA client 130, 142.

In an overall system, the CPU cost (the number of CPU cycles required) of sending and receiving a message may be low. The CPU cost of a DMA operation may be the cost of formatting the DMA descriptor 600, the cost of sending the DMA descriptor message 600 and the cost of handling the DMA completion message 700.

Messaging allows CPUs that use the DMA controller system 100 to be logically distributed throughout a system, even when sharing a single DMA channel 400 (FIG. 4). The messaging unit 108 of the DMA controller 102 may act as a "point of serialization" for a DMA work queue (a message queue 214).

In contrast, the common application of a DMA descriptor list or ring (described above) may require firmware serialization techniques to manage multiple accesses.

The messaging of the system 100 eliminates all such problems by "hiding" the pointers and serialization of pointer updates inside the DMA message module 204. The clients 142 never have to be concerned about semaphores or reading and writing pointer values. This provides a significant performance boost, and allows simpler firmware and hardware DMA clients 142 to be designed.

The DMA descriptor 600 is a single block of data that describes the DMA operation to be performed. A single descriptor 600 may fit well with the messaging model and with the desire for performance.

The single descriptor 600 may reduce the amount of data a DMA channel 400 will pull from memory 132 or 144. Investigations indicate that the CPU cost for formatting the DMA descriptor 600 may be reasonably low. Also, the CPU cost of formatting and sending descriptors 600 may be mitigated by scaling/increasing the number of processors. The DMA descriptor 600 may be a better solution than a "pull" model because writes (messages) may be more efficient than reads, and because the DMA descriptor solution does not rely on shared memory resources to store descriptors.

The single DMA descriptor 600 may also simplify a configuration where a hardware DMA client controls the DMA operation. Hardware control of a DMA channel 400 may use the same message passing mechanism that is used by a firmware DMA client. The use of message passing easily allows the redirection of DMA control messages to firmware for debugging or to adapt to unforeseen requirements. Also, hardware and firmware DMA clients 142 can share DMA channels 400 without the need for complex semaphore mechanisms.

The single response message 700 (FIG. 7) may provide the same benefits of the DMA descriptor message 600: reducing the need for shared memory, making use of the efficiency of a "push" model instead of a "pull" model, allowing shared access to response queues without semaphores, and providing a unified model for both hardware and firmware reception of completion information.

Error Detection Codes (EDCs)

The DMA controller 102 may perform simultaneous calculation of a number of CRCs and checksums, which may collectively be referred to herein as "error detection codes" (EDCs). Examples of EDCs may include an iSCSI CRC (CRC32c), a Fibre Channel CRC (CRC32), and a TCP checksum.

During EDC calculation, the DMA controller 102 may also perform "padding" operations. It is common for protocols to require that an EDC be calculated of "pad bytes" addition to the data that is transferred. The DMA controller 102 may read fields 630, 642, and/or 644 in the DMA descriptor 600, which control when and how much padding should be included in an EDC calculation in addition to the data being transferred.

In some instances, the padding may simply be "zero." The some instances, the padding is part of the data stream on a bus, which is stripped out and not transferred on another bus. For example, when the ASIC bus data controller 404 reads from the ASIC bus 118 (FIG. 1) and the host bus data controller 402 writes to the host bus 124, some data may be read on the ASIC bus and included in the EDC calculation, but not transferred to the host bus 124.

The DMA descriptor 600 includes fields 630, 642, 644 in FIG. 6 that describe which EDCs are to be calculated as the data is moved, where to get and store the "seed values" for the EDCs, and where in the ASIC memory 144 to store the EDC calculation results. For example, the seed value for a given EDC may be provided in the descriptor 600 itself in field 642 or 644, or may be accessed via a pointer in field 642 or 644 to an EDC seed context location at the DMA client 142 or the ASIC memory 144.

Resultant values may be stored back into the seed context locations at the DMA client 142, or ASIC memory 144, and/or sent back as part of the response message 700 in fields 720, 722 in FIG. 7.

Interleaving/Chaining of EDC Calculations

EDC calculations may be required by protocol operations. The EDC calculation of a DMA operation may be interleaved with EDC calculations of other DMA operations (see FIG. 5C) in a DMA channel 400. For example, a single logical EDC calculation may be performed over a number of different DMA operations to different address ranges, as shown in FIGS. 5A–5D. EDC seed pointers in fields 642, 644 and context locations at a DMA client 142 or ASIC memory 144 may play an important role in handling EDC calculations over logically contiguous, but physically and temporally separate blocks of data moved by the DMA controller 102. EDC seed pointers and context locations allow various separate DMA and EDC calculations to be "stitched" or "chained" together into logical EDC calculations.

FIGS. 5A–5D show an example of EDC "chaining" by using context locations. The example uses the calculation of iSCSI CRCs and TCP checksums, but other types of EDCs may be used.

FIG. 5A shows a first logical set 500 of data transfers that includes six DMA operations 502–512 (each DMA operation has its own DMA descriptor 600). The six operations 502–512 may occur in time such that the first operation 502 ("DMA A1") to the last operation 512 ("DMA A6") is from left to right. An ISCSI CRC calculation (iSCSIA0) is to be performed over the data transferred by the first four DMA operations 502–508 ("DMA A1" to "DMA A4"). A second iSCSI CRC calculation (iSCSIA1) is to be performed over the data transferred by the last two DMA operations 510, 512 ("DMA A5" to "DMA A6"). A TCP checksum (TCPA0) is to be performed over the data transferred by the first two DMA operations 502, 504 ("DMA A1" and "DMA A2"). A second TCP checksum is to be performed over the last four DMA operations 506–512 ("DMA A3"–"DMA A6").

FIG. 5B shows a second logical set of data transfers that includes four DMA operations 522–528. In this example, the four DMA operations 522–528 will use the same DMA channel 400 as the DMA transfers 502–512 in FIG. 5A. Two iSCSI CRC calculations (iSCSIB0 and iSCSIB1) and two TCP checksums (TCPB0 and TCPB1) are to be performed over the four DMA operations 522–528. The ISCSI and TCP checksums to be calculated are illustrated in the same fashion as in FIG. 5A.

FIG. 5C shows how the two logical sets of data transfers 502–512, 522–528 may be queued to the DMA controller 102. In other words, FIG. 5C shows the order in which DMA descriptors 600, associated with the data transfers 502–512, 522–528, are queued in a message queue 214 in the message RAM 208. The DMA descriptors associated with the DMA transfers 502–512, 522–528 may be interleaved within the same message queue 214. "Interleaved within the same message queue" 214 means all the DMA descriptors for a given logical transfer may not be in consecutive order in the message queue 214. During the process of queuing the DMA descriptors 600, they may be interleaved with DMA descriptors 600 for other logical transfers. Thus, the order of DMA descriptors 600 in a message queue 214 may alternate between different logical transfers, or may alternate between small groups of descriptors 600 from different logical transfers. Such logical transfers may come from different DMA clients 142 or from the same client 142.

The eight EDC calculations (iSCSIA0, iSCSIA1, iSCSIB0, iSCSIB1, TCPA0, TCPA1, TCPB0 and TCPB1) are not necessarily performed on consecutive DMA operations. The arrows in FIG. 5C show how the EDC seed results from previous partial EDC calculations are "chained" through EDC context locations (at a DMA client 142 or ASIC memory 144) in order to correctly compute the final EDC results. For example, the iSCSIA0 EDC seed results from partial EDC calculations on data in DMA operations 502, 504, 506 and 508 that are "chained" together. The use of EDC context locations is implied by the presence of the arrows in FIG. 5C.

FIG. 5D illustrates which EDC context locations (iSCSIA, iSCSIB, TCPA, and TCPB) (at a DMA client 142 or ASIC memory 144) are read and/or written in association with each DMA descriptor 600 for the DMA operations 502–512, 522–528 in FIG. 5C.

In FIG. 5C, EDC chaining of iSCSIA0 and iSCSIA1 may use an EDC context location "iSCSIA." Chaining of iSCSIB0 and iSCSIB1 may use an EDC context location "iSCSIB." Chaining of TCPA0 and TCPA1 may use an EDC context location "TCPA." Chaining of TCPB0 (for which there is no actual chaining) and TCPB1 may use an EDC context location "TCPB." EDC context locations iSCSIA, iSCSIB, TCPA, and TCPB may each include a 32-bit memory location and reside in a DMA client 142 or ASIC memory 144.

The EDC context locations are written to and read from each time a "chaining arrow" for a given EDC calculation is shown in FIG. 5C. In cases where a "chaining arrow" does not "skip over" any DMA operations (and associated descriptors) from left to right, the read from the EDC context location may be suppressed as the DMA controller 102 already has the value from the previous descriptor 600.

Transfer Coalescing

In order to be more efficient with bus (e.g., host bus PCI or PCI-X) and memory utilization, the DMA controller 102 may "coalesce" multiple DMA operations into larger transfers. The DMA controller 102 may examine fields 624–638 of a sequence of DMA descriptors 600 (FIG. 6) in a message queue 214, and optimize the number of data transfers required to perform the DMA transfers.

For example, if three descriptors 600 are posted in a message queue 214, and address fields 636–638 of the second and third descriptors point to host buffers of the host memory 132 that start immediately after a host buffer pointed to by the previous descriptor, the DMA controller 102 may perform a single data transfer from host memory 132 onto the host bus 124. The single data transfer would satisfy data movement requirements of all three descriptors. This process may be described as "transfer coalescing." Each descriptor 600 may still be processed individually by the DMA channel 400 for EDCs and completion notifications.

The same optimization may be applied for accesses to an ASIC bus 118 via the DMA ASIC bus interface 106.

Both read and write transfer coalescing may be implemented.

An advantage to this form of coalescing is DMA operations will not have their data transfers delayed in order to gain an advantage. If the DMA controller 102 is idle, it may start processing a new DMA request immediately. If the DMA message queue 214 in FIG. 2 is backed up with a number of DMA descriptors 600, the DMA controller 102 has the opportunity to coalesce subsequent transfers by combining a number of queued descriptors 600 in the message queue 214.

The degree of coalescing may be hidden in the DMA controller 108 and may not be visible to a programming interface. The "single descriptor, in-order completion" model may be preserved even when coalescing is performed.

A number of embodiments have been described. Nevertheless, it will be understood that various modifications may be made without departing from the spirit and scope of the invention. Accordingly, other embodiments are within the scope of the following claims.

What is claimed is:

1. A data transfer system comprising:
   a first bus interface;
   a second bus interface;
   a first-in-first-out memory coupled to the first bus interface and the second bus interface;
   a controller coupled to the first-in-first-out memory; and
   a message unit coupled to the controller, the message unit being operable to queue a plurality of data transfer request messages from at least the first bus interface, the controller being operable to process each data transfer request message and transfer data between the first bus interface, the first-in-first-out memory and the second bus interface.

2. The system of claim 1, wherein the controller is operable to calculate error detection codes for data stored in the first-in-first-out memory.

3. The system of claim 1, wherein the controller is operable to calculate cyclic redundancy codes for data stored in the first-in-first-out memory.

4. The system of claim 1, wherein the controller is operable to calculate checksums for data stored in the first-in-first-out memory.

5. The system of claim 1, wherein the controller is operable to send a data transfer response message via the first or second bus interfaces to a client that sent a data transfer request message.

6. The system of claim 1, wherein the first bus interface may receive a data transfer request message from firmware.

7. The system of claim 1, wherein the first bus interface may receive a data transfer request message from a hardware component.

8. The system of claim 1, wherein the first bus interface is coupled to a host computer bus.

9. The system of claim 1, wherein the first bus interface is coupled to a peripheral card interface (PCI) bus.

10. The system of claim 1, wherein the first bus interface is coupled to a peripheral card interface X (PCI-X) bus.

11. The system of claim 1, wherein the second bus interface is coupled to an application specific integrated circuit (ASIC) bus.

12. The system of claim 1, wherein the controller is operable to transfer data from the first bus interface to the first-in-first-out memory using a first clock domain, and transfer data from the second bus interface to the first-in-first-out memory using a second clock domain.

13. The system of claim 1, wherein the controller is operable to simultaneously process data transfers request messages from a plurality of clients.

14. A memory access controller system comprising:
   a first bus interface;
   a second bus interface;
   a memory controller operable to control reads and writes to a plurality of first-in-first-out memory queues; and
   a plurality of channels, each channel being operable to process a data transfer request message from the second bus interface, instruct the memory controller to write data from a second bus to a first-in-first-out memory queue associated with the channel, and instruct the memory controller to read data from the first-in-first-out memory queue to send to a first bus.

15. The memory access controller system of claim 14, wherein each channel comprises a master controller, a first bus data controller and a second bus data controller, wherein the master controller is operable to process a data transfer request message from the second bus interface and instruct the first and second bus data controllers to control the memory controller.

16. The memory access controller system of claim 14, wherein each channel has a configurable priority level.

17. The memory access controller system of claim 14, wherein the first bus interface arbitrates between requests from the plurality of channels to access the memory controller.

18. The memory access controller system of claim 14, wherein the second bus interface arbitrates between requests from the plurality of channels to access the memory controller.

19. The memory access controller system of claim 14, wherein the memory controller calculates an error detection code when data is read from a first-in-first-out memory queue.

20. The memory access controller system of claim 19, being operable to store an error detection code seed value related to a data transfer.

21. The memory access controller system of claim 19, being operable to chain error detection code values.

22. The memory access controller system of claim 19, being operable to suppress a context location read operation.

23. The memory access controller system of claim 14, wherein each channel is operable to examine a plurality of data transfer request messages and coalesce data transfers for data transfer request messages that have contiguous source addresses.

24. The memory access controller system of claim 14, being operable to receive and process data transfer request messages from a plurality of clients.

25. The memory access controller system of claim 14, being operable to receive a data transfer request message from a firmware client.

26. The memory access controller system of claim 14, being operable to receive a data transfer request message from a hardware client.

27. The memory access controller system of claim 14, being operable to receive a data transfer request message from a host computer system.

28. A method of transferring data, the method comprising:
   receiving a data transfer request message;
   queuing the data transfer request message;
   reading the data transfer request message;
   reading data specified by the data transfer request message from a source memory location and transferring the data to a first-in-first-out memory; and
   transferring the data stored in the first-in-first-out memory to a destination memory location specified by the data transfer request message.

29. The method of claim 28, further comprising forming the data transfer request message.

30. The method of claim 28, further comprising forming a data transfer response message.

31. The method of claim 28, further comprising arbitrating access to the first-in-first-out memory among data transfer request messages with different priorities.

32. The method of claim 28, further comprising calculating an error detection code for data stored in the first-in-first-out memory.

33. The method of claim 28, further comprising updating a credit count register.

34. The method of claim 28, further comprising interleaving a plurality of data transfers and performing error detection operations on the interleaved data transfers.

35. The method of claim 28, further comprising suppressing a context location read operation.

36. The method of claim 28, further comprising coalescing multiple data transfers into a single data transfer.

* * * * *